United States Patent Office 2,926,207
Patented Feb. 23, 1960

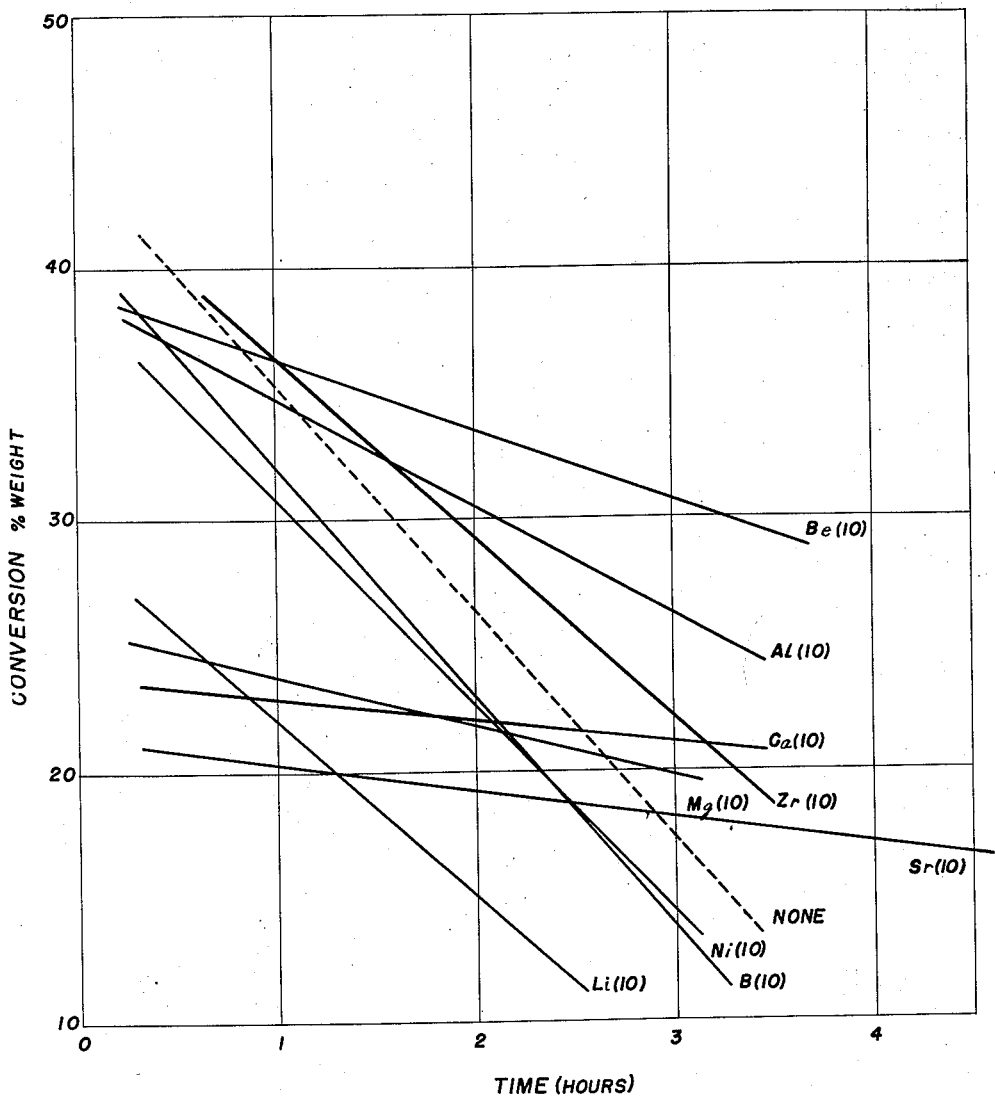

2,926,207
ISOMERIZATION CATALYSTS AND PROCESS

Hillis O. Folkins, Crystal Lake, and Marcellus J. Geerts, Evanston, Ill., assignors to The Pure Oil Company, Chicago, Ill., a corporation of Ohio Application December 31, 1956, Serial No. 631,696

9 Claims. (Cl. 260—683.65)

This invention relates to a catalyst composition for use in increasing the efficiency of the chain isomerization of saturated hydrocarbons having 4 to 8 carbon atoms per molecule. It is more specifically concerned with improving effectiveness of catalyst composites containing small amounts of a hydrogenation component supported on an acidic, solid, adsorbent support for isomerizing light petroleum distillates containing $C_5$–$C_8$ n-paraffinic constituents.

When alkanes containing four or more carbon atoms are contacted in the presence of Friedel-Crafts catalysts under relatively mild conditions, isomerization to branched chain hydrocarbons occur. Although effective as catalysts, metal halides employed as Friedel-Crafts catalysts have certain inherent disadvantages, such as corrosiveness due to the use of acid promoters, sludging tendencies, sensitivity to impurities in the feed stock. In the production of high octane number gasolines by means of an integrated gasoline manufacture scheme alkane isomerization is an important complementary refining process. The reformate produced having a high content of aromatic hydrocarbons, does not have a high T.E.L. susceptibility. To permit maximum effectiveness from the T.E.L. incorporated in the gasoline blends, high octane number paraffinic hydrocarbons having a high lead susceptibility must be included in the formulation of the finished gasoline. To facilitate the art of isomerization of light petroleum distillates, adsorbent, acidic mixtures of solid, refractory oxides which avoid the disadvantages attendant in using metal halide catalysts in this service have been developed as catalysts. Solid, oxide catalysts of this type are exemplified by acidic type catalysts which are capable of proton transfer (Industrial & Engineering Chemistry, 41, 2573, 1949). These catalysts in addition to having acidic properties also evince hydrocarbon cracking activity.

Specific examples of these compositions include but are not limited to silica-alumina, silica-zirconia, silica-titania, alumina-zirconia, alumina-beryllia, silica-magnesia, silica-alumina-zirconia, silica-alumina-beryllia, acid-treated clays, and others.

Although solid catalysts of this nature are useful in promoting the acid-catalyzed isomerization reaction, it was subsequently found that the incorporation of nickelous hydrogenation agents, inter alia, in the acidic, mixed refractory oxide composite increased the effectiveness of these acid-type catalysts for the conversion of normal hydrocarbons to isoparaffins. (Cf. Ciapetta, et al., Industrial & Engineering Chemistry, 45 (1) 147, et seq.) While these nickelous hydrogenation agent-acidic refractory oxide catalyst compositions provide suitable selectivities and conversions in the chain isomerization of n-paraffins, it has been found that these catalysts are sensitive to deactivation resulting in a rapid depreciation in their efficiency.

It is therefore the principal object of this invention to modify the composition of nickelous hydrogenation agent-acidic, refractory oxide composite isomerization catalyst to improve their stability. This and other objects will become apparent from the following detailed description of this invention.

According to this invention, superior catalyst compositions, showing less sensitivity to changes in process conditions, and longer cycle life, are obtained by the incorporation of minor amounts of selected metal phosphates into the nickelous hydrogenation agent-refractory acidic oxide composite isomerization catalyst. Specific phosphates which have been found to be effective are the phosphates of beryllium, magnesium, calcium, strontium, zirconium and aluminum.

To illustrate the instant invention, an investigation of the effect of various phosphates on the stability of a nickel-silica-alumina composition was carried out. The preferred method of preparing these catalysts consists of adding the metal phosphate to the already calcined acidic support, calcining the resulting composition and subsequently adding the nickel, in suitable manner. As an example, a catalyst composed of 5% nickel on a 75–25 silica-alumina support, previously treated with aluminum phosphate, was prepared as follows:

EXAMPLE I 86.3 grams of aluminum nitrate, $Al(NO_3)_3.9H_2O$, were dissolved in 425 ml. of distilled water. To this solution was added, with rapid stirring, 250 grams of a microspherodial silica-alumina (25% alumina) commercial fluid cracking catalyst (Davison-High Alumina, Oil & Gas Journal, p. 121 et seq., October 17, 1955). After stirring 30 minutes, an aqueous solution of 30.3 grams of $(NH_4)_2HPO_4$ in 250 ml. of distilled water was slowly added to precipitate the aluminum phosphate in the pores of the silica-alumina support. The resultant mixture was stirred 30 minutes, allowed to stand one hour, and filtered. The resultant loose cake was dried at 230° F. overnight, and calcined by gradually increasing the temperature to 1150° F. and calcining at that temperature for six hours.

190 grams of the above catalyst support were slurried into a nickel nitrate solution consisting of 49.5 grams of $Ni(NO_3)_2.6H_2O$ in 250 ml. of distilled water. To this, with stirring, was added a solution containing 27 grams of $(NH_4)_2CO_3.H_2O$ in 250 ml. of water. The mixture was stirred 15 minutes and the supernatant liquid was filtered off. The cake was dried at 230° F. for 16 hours. The resulting dried catalyst was pelleted into ⅛" pellets and activated. The activation procedure employed for the testing of this catalyst consisted in heating the catalyst slowly to 975° F. in a stream of hydrogen over a period of five hours and subsequently maintaining the catalyst in hydrogen flow for 16 hours. Following this the catalyst was oxidized at 975° F. in a stream of air, cooled to 800° F. in air and reduced at subatmospheric pressure in a stream of hydrogen for one hour.

Because these catalysts are sensitive to process conditions and lose activity with time on stream at low hydrogen/hydrocarbon ratios, experiments were chosen in which the activity and relative stability of the individual catalysts could be readily compared. Thus, activities were initially determined, in the first half-hour of a run, at a hydrogen/hydrocarbon mol ratio of 0.5 after which the ratio was decreased to 0.25 and the run continued. At a hydrogen/hydrocarbon mol ratio of 0.25, degeneration rates are greatly accelerated and thus a comparison of results obtained over the various catalysts provides a direct measure of their relative stabilities. Hence, the data presented in Table I show the activity for each catalyst at a hydrogen/hydrocarbon mol ratio of 0.5 in the first line, and in the second line is shown the activity after a certain period of time under accelerated degenerative conditions (i.e., at a hydrogen/hydrocarbon mol ratio of 0.25). From these data the relative stabilities of the different catalysts are readily apparent. The other operating conditions in all the runs were as follows: temperature, 700° F.; pressure, 350 p.s.i.g.; and liquid volume hourly space velocity, 4.5. n-Pentane was used as charge stock in all these experiments.

*Table I*

ISOMERIZATION OF n-PENTANE

| Catalyst | Time (hrs.) | Yield Data, Percent | | |
|---|---|---|---|---|
| | | Conversion | Yield | Selectivity |
| 5% Ni-(75-25) Silica-alumina having incorporated therein the following phosphates: | | | | |
| None | 0.50 | 40.0 | 31.9 | 79.8 |
| | 3.12 | 16.3 | 13.3 | 81.8 |
| Lithium | 0.77 | 23.6 | 14.2 | 60.1 |
| | 1.92 | 15.6 | 12.0 | 77.0 |
| Beryllium | 0.33 | 38.2 | 30.3 | 79.4 |
| | 3.50 | 29.4 | 27.5 | 93.4 |
| Magnesium | 0.48 | 24.8 | 18.6 | 74.8 |
| | 2.75 | 20.3 | 17.8 | 87.4 |
| Calcium | 0.45 | 23.4 | 14.7 | 62.9 |
| | 3.07 | 21.1 | 17.4 | 82.5 |
| Strontium | 0.80 | 20.6 | 14.6 | 70.9 |
| | 4.63 | 17.6 | 13.9 | 79.2 |
| Boron | 0.50 | 36.6 | 30.1 | 82.2 |
| | 3.08 | 13.0 | 11.1 | 85.1 |
| Aluminum | 0.50 | 36.9 | 30.3 | 82.0 |
| | 2.40 | 27.7 | 26.1 | 94.0 |
| Zirconium | 0.80 | 37.7 | 30.0 | 79.5 |
| | 3.38 | 19.4 | 15.7 | 80.9 |
| Nickel | 0.50 | 34.8 | 30.9 | 88.8 |
| | 2.65 | 17.3 | 15.3 | 88.5 |

The conversion data are graphically presented in the drawing which clearly shows the unusual results obtained from the selected phosphate stabilizing agents used in this invention. Reference to the drawing will show that the conversion obtained using the unstabilized foundation catalyst rapidly diminshes as shown by the acute slope of the broken line representing this composition. A number of phosphates, including those of lithium, boron, and nickel, have a detrimental effect in improving the stability of the foundation catalyst. In contradistinction, the selected phosphate stabilizing agents have a significant effect as evinced by the improved stability of the catalysts containing selected phosphate stabilizers of this invention.

In the preparation of the stabilized catalyst of this invention, the refractory, acidic oxide composite can be prepared according to any suitable prior art technique. The oxides, with or without silica, are synthetically prepared by separate, successive, or co-precipitation techniques. The acid-treated clays are prepared by the acid treating of naturally-occurring clays of the montmorillonite type.

The refractory, acidic oxide support is composited, either without drying and/or calcining, with the metal phosphate in any suitable manner. It is generally preferred to add the metal phosphate to the silica-alumina or other acidic support, and to calcine the resulting composition before the addition of the nickel or other active metal component. The phosphate may be added by impregnation or precipitation methods to the undried silica-alumina gel, or it may be added by impregnation or precipitation on an already calcined acidic support, such as silica-alumina. Satisfactory results, however, can be obtained by incorporating the metal phosphate in the composite catalyst subsequent to or simultaneously with the addition of the hydrogenation component to the refractory, acidic oxide support.

The nickelous hydrogenation component is included in the catalyst composition using conventional techniques such as precipitation, impregnation, or others. For example, see Catalysis, Emmet, Reinhold, Chap. 7. Although metallic nickel is employed as the illustrative nickelous hydrogenation agent in the specific example, other nickel compositions can be used, such as nickel molybdate, nickel tungstate, nickel chromate, nickel borate, nickel manganate.

In formulating the catalysts of this invention, refractory, acidic oxide composites containing 50–87% silica and 50–13% alumina or zirconia are preferred. The quantity of nickelous hydrogenation present will range from about 0.5–8% by weight, calculated as nickel and based on the quantity of acidic oxide composite employed as the principal constituent. About 1–15% by weight, calculated as phosphate and based on finished catalyst composition, of the selected metal phosphate will achieve the objectives of this invention.

The instant invention is employed in the isomerization of saturated, isomerizable hydrocarbons having 4–8 carbon atoms per molecule. Feed stocks which can be used include pentane, heptane, hexane, or mixtures thereof, such as virgin petroleum distillates having a boiling range up to about 210° F., natural gasolines, light catalytic reformate, hydrogenated light coker naphtha, and others. Operating conditions selected for the isomerziation of these feed stocks are employed, viz.;

| | Range | Preferred |
|---|---|---|
| Temperature, ° F | 600–750 | 650–725 |
| Pressure, p.s.i.g | 180–1,000 | 350–750 |
| Liquid Volume Hourly Space Velocity | 0.1–10 | 0.5–5.0 |
| H₂/hydrocarbon mol ratio | 0.1–4.5 | 0.5–3.5 |

It is evident that modifications and variations within the scope of this invention will be apparent to those skilled in this art. Accordingly, the instant invention is limited, not by the foregoing discussion and specific embodiments, but only as defined by the following claims.

We claim as our invention:

1. A catalyst composition for effecting the chain isomerization of isomerizable, saturated hydrocarbons having 4–8 carbon atoms per molecule which consists essentially of a siliceous, refractory mixed oxides base, containing 50–87% by weight of silica and 50–13% by weight of an oxide selected from the group consisting of alumina and zirconia, composited to evince acidic properties, and having hydrocarbon cracking activity, 0.5–8% by weight, calculated as nickel and based on the portion of said acidic base, of a hydrogenation agent selected from the group consisting of nickel, nickel molybdate, nickel tungstate, nickel chromate, nickel borate and nickel maganate, and having incorporated in said composition 1–15% by weight, based on said catalyst composition, of at least one phosphate of a metal selected from the group consisting of aluminum, beryllium, calcium, magnesium, zirconium and strontium to enhance the stability of the catalyst composition.

2. A composition in accordance with claim 1 in which said phosphate is beryllium phosphate.

3. A catalyst in accordance with claim 2 in which the hydrogenation agent is nickel.

4. A catalyst composition in accordance with claim 1 in which said phosphate is aluminum phosphate.

5. A catalyst in accordance with claim 4 in which the hydrogenation agent is nickel.

6. An isomerization process which comprises contacting a feed stock composed principally of 5–8 carbon atom normal paraffinic hydrocarbons at a temperature of 600–750° F., a pressure of 180–1000 p.s.i.g., a liquid volume hourly space velocity of 0.1–10.0, and a H₂/hydrocarbon mol ratio of 0.1–4.5 in the presence of a catalyst which consists essentially of a major portion of a siliceous, refractory mixed oxides base, containing 50–87% by weight of silica, composited to evince acidic properties and having hydrocarbon cracking activity, a minor amount of a hydrogenation agent selected from the group consisting of nickel, nickel molybdate, nickel tungstate, nickel chromate, nickel borate and nickel manganate, and having incorporated in said composition 1–15% by weight, based on said catalyst composition, of at least one phosphate of a metal selected from the group consisting of aluminum, beryllium, calcium, magnesium, zirconium and strontium to enhance the stability of the catalyst composition.

7. An isomerization process which comprises contacting a feed stock composed principally of 5–8 carbon atom per molecule normal paraffinic hydrocarbons at a temperature of 600–750° F., a pressure of 180–1000 p.s.i.g., a liquid volume hourly space velocity of 0.1–10.0, and a $H_2$/hydrocarbon mol ratio of 0.1–4.5 in the presence of a catalyst which consists essentially of a siliceous, refractory mixed oxides base, containing 50–87% by weight of silica and 50–13% by weight of an oxide selected from the group consisting of alumina and zirconia, composited to evince acidic properties, and having hydrocarbon cracking activity, 0.5–8% by weight, calculated as nickel and based on the portion of said acidic base, of a hydrogenation agent selected from the group consisting of nickel, nickel molybdate, nickel tungstate, nickel chromate, nickel borate and nickel manganate, and having incorporated in said composition 1–15% by weight, based on said catalyst composition, of at least one phosphate of a metal selected from the group consisting of aluminum, beryllium, calcium, magnesium, zirconium and strontium to enhance the stability of the catalyst composition.

8. Process in accordance with claim 7 in which the mixed oxides base is a silica-alumina composition, the hydrogenation agent is nickel, and the phosphate is aluminum phosphate.

9. Process in accordance with claim 7 in which the mixed oxides base is a silica-alumina composition, the hydrogenation agent is nickel and the phosphate is beryllium phosphate.

References Cited in the file of this patent

UNITED STATES PATENTS

| | | |
|---|---|---|
| 2,441,297 | Stirton | May 11, 1948 |
| 2,550,531 | Ciapetta | Apr. 24, 1951 |
| 2,569,092 | Deering | Sept. 25, 1951 |
| 2,718,535 | McKinley et al. | Sept. 20, 1955 |

FOREIGN PATENTS

| | | |
|---|---|---|
| 487,392 | Canada | Oct. 21, 1952 |